H. E. FISHER.
MOLD FOR RUBBER TIRES AND TUBES.
APPLICATION FILED MAR. 20, 1920.

1,380,645.

Patented June 7, 1921.

Inventor
Harry E. Fisher

By
his Attorneys

UNITED STATES PATENT OFFICE.

HARRY E. FISHER, OF MIFFLIN TOWNSHIP, FRANKLIN COUNTY, OHIO.

MOLD FOR RUBBER TIRES AND TUBES.

1,380,645. Specification of Letters Patent. Patented June 7, 1921.

Application filed March 20, 1920. Serial No. 367,408.

*To all whom it may concern:*

Be it known that I, HARRY E. FISHER, a citizen of the United States, residing at Mifflin township in the county of Franklin and State of Ohio, have invented a certain new and useful Improvement in Molds for Rubber Tires and Tubes, of which the following is a specification.

Heretofore molds for vulcanizing rubber tires and tubes have been constructed of large heavy metallic castings, the appropriated parts of which are machined or engraved to provide the desired or ornamented molding surfaces. The production of such molds has been attended with great expense because the machining and engraving required careful protracted labor; and further because oftentimes the fact that the castings were defective was not discovered until the work was advanced it was necessary to discard many pieces.

The object of the present invention is to simplify, facilitate and cheapen the production of such molds.

In the accompanying drawings forming part hereof—

In the views 5 designates a housing or receptacle composed of enough sections to form a circular structure. Within these I place separate sections 6 bearing plain, ornamental or special molding surfaces 7. The sections 6 are secured to the sections 5 by means of screw bolts such as shown at 8. To promote the placing and alinement of the sections 5 the two are provided with a tongue and recess fitting each other as shown at $5^a$ and $6^a$ respectively. These tongues and recesses need not be coextensive with the length of the section.

Figure 2:
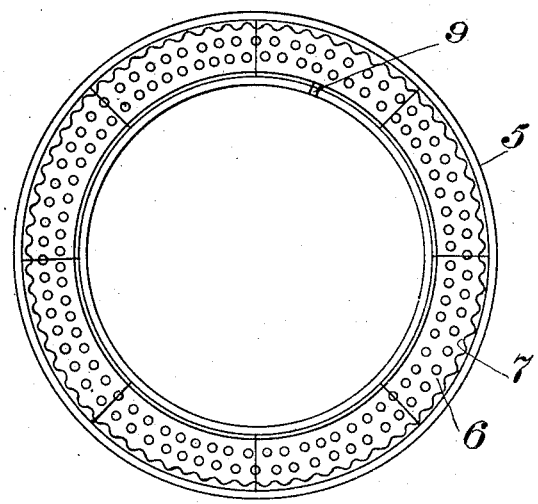
Fig. 2 is a plan view taken on the line I—I Fig. 1.
Figure 1:
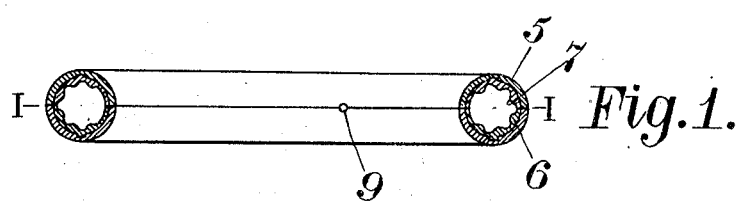
Figure 1 is a diametrical section of the complete mold according to my invention.
Figure 3:
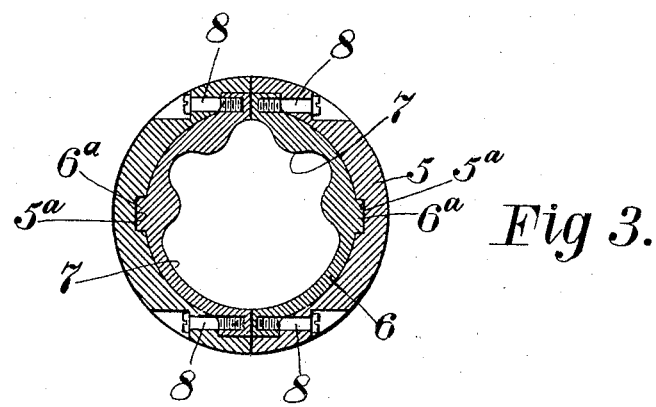
Fig. 3 is a detail cross section of the mold on a larger scale.

The necessary number of housing sections 5 equipped with facing or molding sections 6 are placed together as shown in Fig. 1 and bound together by any suitable means to form the circular molding cavity. The mold shown is designed for forming an inner tube and in this case, one of the pair of sections may be provided with a seat or opening 9 to receive the inflating nipple of the tube to be vulcanized.

An advantage of my invention, among others, is that the facing 6 can be made with extreme economy by the die casting process thereby dispensing with the expense and waste involved in casting, engraving and dressing the large pieces as heretofore stated. Another advantage is that the facings 6 can be made interchangeable and facings of other design substituted in a given housing. A further advantage is that because the facings are thin and light they can be handled easily and transported without great labor.

The forms of the parts, the material of which they are made and the manner of making them can be changed without departing from the invention as claimed.

What I claim is:

A mold for a rubber tire member comprising in combination, a housing of circular form divided centrally in its plane to form two parts, and separable sections having molding surfaces seated in each of said housing parts, and means for securing said separable molding sections to the housing parts.

HARRY E. FISHER.